Alphons O. Jaeger
INVENTOR

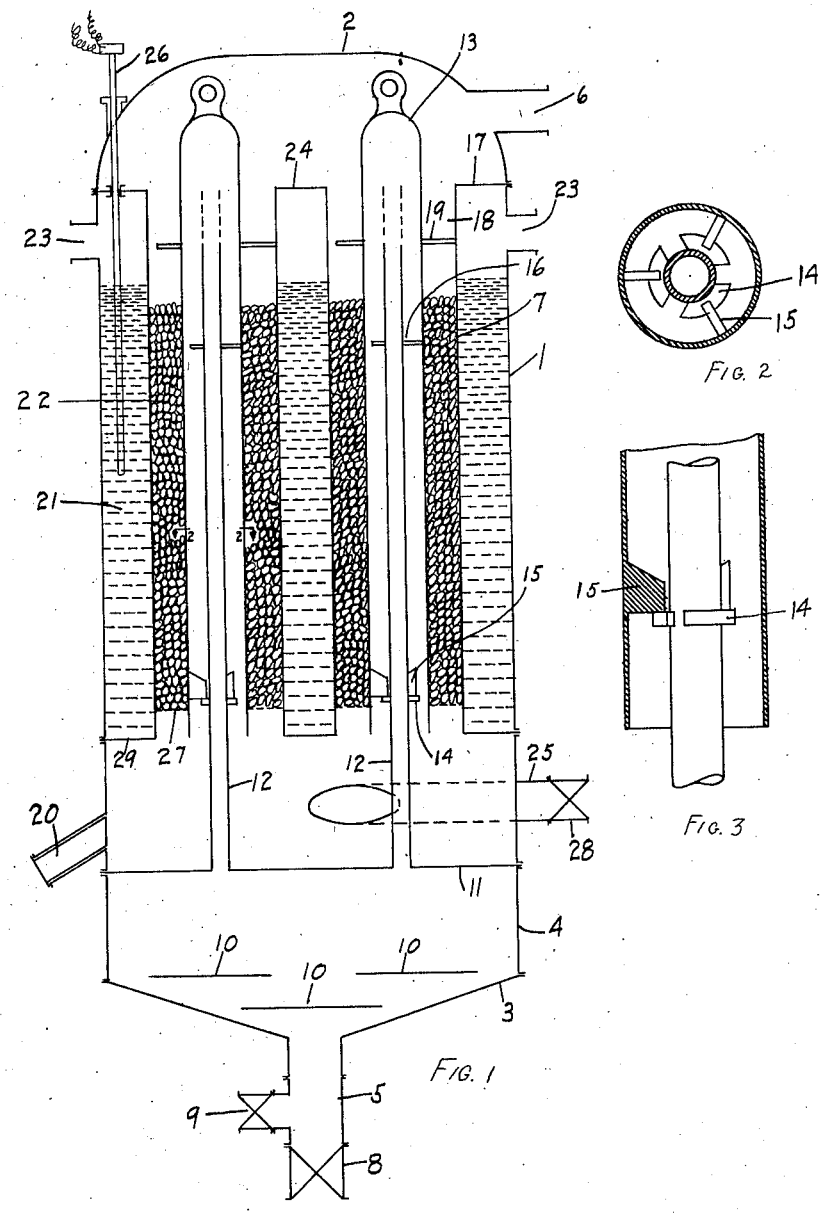

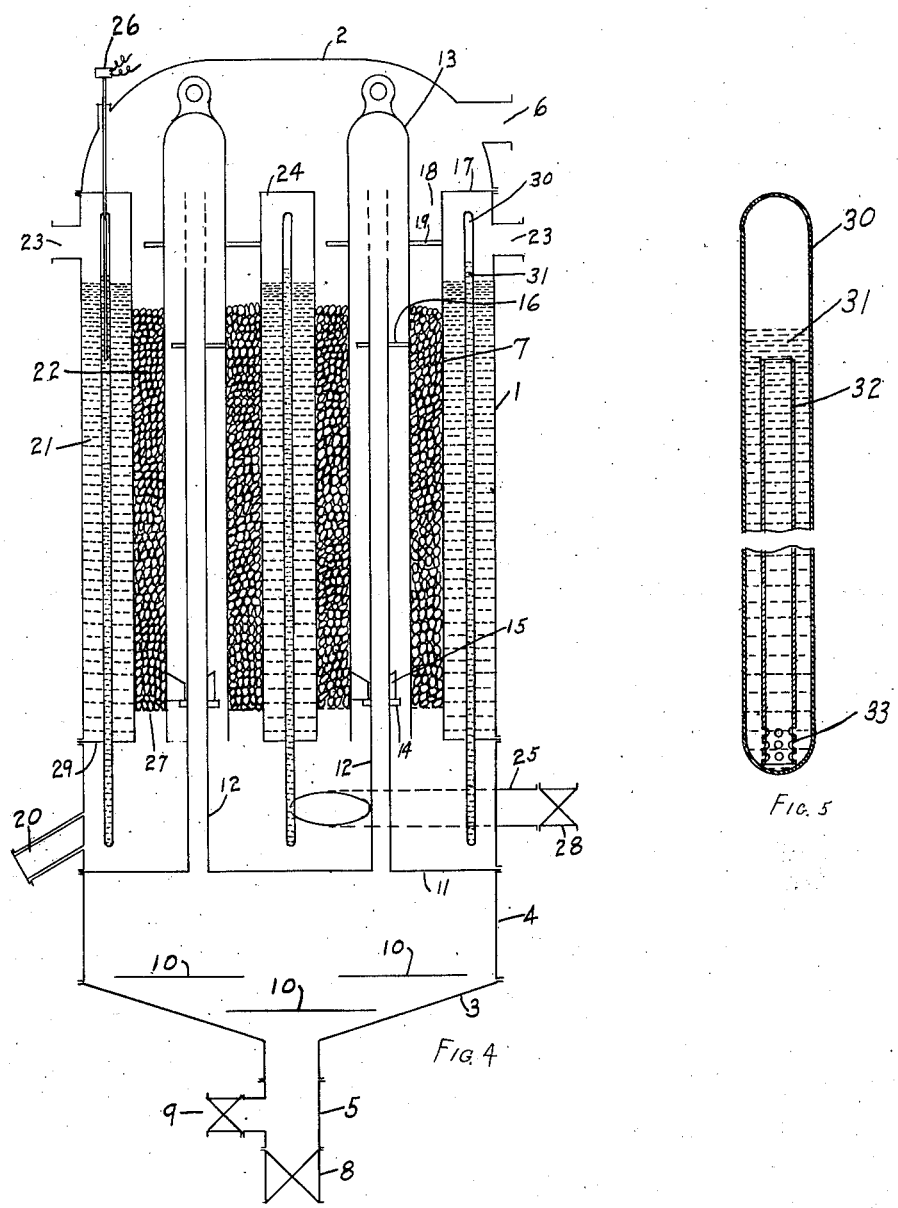

Alphons O. Jaeger
INVENTOR

Dec. 31, 1929. A. O. JAEGER 1,741,309
CATALYTIC APPARATUS
Filed Dec. 13, 1927 5 Sheets-Sheet 5

Alphons O. Jaeger
INVENTOR.
BY
ATTORNEY

Patented Dec. 31, 1929

1,741,309

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC APPARATUS

Application filed December 13, 1927. Serial No. 239,725.

This invention relates to catalytic apparatus and more particularly to converters for use in vapor phase reactions which are either highly exothermic or require a very accurate temperature control.

In the past two general methods of temperature control have been used in catalytic converters. In the one type the catalyst is cooled or its temperature regulated by means of radiation to the air or the cooling effect of the reaction gases themselves. This type of converter has found extensive use particularly in the oxidation of sulfur dioxide to sulfur trioxide by the contact process. Gas cooled converters, however, have found but relatively little use in highly exothermic reactions, such as many oxidations of organic compounds to intermediate products, or in reactions where a very delicate temperature control is necessary. The second type of converter uses a cooling bath which may be either boiling or non-boiling. It was proposed at one time to cool a catalyst layer by distributng a cooling bath in tubes or compartments embedded in the catalyst. This type has been substantially a complete failure in strongly exothermic reactions as, if the reaction is not uniform throughout the catalyst layer, one or more of the compartments will be overheated and if a boiling bath is used may be boiled dry. Another type of bath converter places the catalyst in a large number of relatively small tubes or other compartments surrounded by a cooling bath. This type of converter gives excellent results and permits carrying out of most delicate and most strongly exothermic reactions with great reliability. The converter structure, however, is expensive owing to the great number of small tubes and the necessity for making and keeping tight an enormous number of small welded joints. There is also a certain amount of difficulty with some kinds of catalyst in maintaining a uniform resistance to gas flow in the various tubes. It has hitherto not been practicable to use bath converters with large tubes as the catalyst is usually a poor conductor of heat either by its nature or due to the fact that catalyst granules or particles touch each other at only a few points and, therefore, when large tubes are used there is a serious tendency to form hot spots in the tube where the reaction is exothermic or cold spots where the reaction is endothermic. Where delicate temperature control is necessary it has been the practice in the past to use very small tubes, having a diameter of 2 cm. or less.

The present present invention combines the advantages of gas cooling and of relatively large catalyst layers with the control features of bath cooled converters of the catalyst tube type. Essentially the converters of the present invention consist in a relatively small number of large diameter catalyst tubes surrounded by a bath which may or may not boil at or slightly above the reaction temperature. In the center of these catalyst tubes are arranged double counter current heat exchange elements through which at least part of the reaction gases pass. The catalyst, therefore, is arranged in the form of annuli having their outer surface cooled by a bath and their inner surface by the reaction gases. This effectively permits the use of relatively large catalyst tubes and also permits using the reaction gases as the primary cooling agent where the exotherm is not excessive. The double current heat exchangers provide an automatic temperature regulation since the cooling or heating effect of the incoming gases varies directly with the amount of reaction gases flowing through within wide limits. An automatic temperature control of the center of the catalyst annuli is, therefore, possible and excess endotherm or exotherm is taken care of by the bath.

Apart from the structural advantages of using relatively large tubes it is possible, due to the use of reaction gas cooling to greatly decrease the cost of the bath in many reactions. Thus, where a very delicate temperature control is necessary and particularly where the reaction generates a very high exotherm it has been difficult to cool with a bath which does not boil at about the reaction temperature. Boiling baths for many organic oxidations, however, necessitate the use of mercury or mercury alloys which boil at the desired temperature as the temperature used frequently, one might say usually, is too high to permit the use of other boiling fluids. Mercury, due to its weight and high price, greatly increases the cost of converters and adds a distinctive maintenance hazard due to the high toxicity of mercury vapors. In the converters of the present invention where reaction gas cooling can be relied upon for a large proportion of the cooling or temperature regulation, it is frequently possible to use baths which are not boiling, such as for example lead baths or baths of other cheap metals or alloys, and in some modifications the advantages of boiling bath temperature control can be availed of in using a cheap bath with relatively small compartments of boiling fluid are interspersed through it. While it is an advantage of the present invention that in many cases it permits using a bath that is non-boiling, it should be understood that the invention is also of advantage when the reaction necessitates the powerful cooling effect of a boiling bath and in such cases it is possible not only to enhance the control but also in many cases to greatly reduce the volume of boiling bath needed with a correspondingly large decrease in converter cost.

The converters of the present invention are applicable to a very large number of catalytic reactions, in fact they can be used in substantially any vapor phase catalytic reaction. Among the most important reactions for which converters of the present invention are suited are the following:—anthracene-containing materials to anthraquinone, toluol or derivatives of toluol to corresponding benzaldehydes and benzoic acids, benzol to maleic acid, acenaphthene to acenaphthquinone, bisacenaphthyldidenedione, naphthaldehydic acid, naphthalic anhydride, and hemimellitic acid, fluorene to fluorenone, eugenol and isoeugenol to vanillin and vanillic acid, methyl alcohol and methane to formaldehyde, ethyl alcohol to acetic acid, ethylene chlorhydrine to chloracetic acid and the like. Organic oxidations in which impurities are selectively burned out or transformed into easily removable substances also require accurate control. Examples of such reactions are the purification of crude anthracene or phenanthrene by the selective catalytic combustion of carbazol, the purification of crude naphthalene, crude mononuclear aromatic hydrocarbons, aromatic hydrocarbons, and crude aliphatic compounds such as high sulfur oils and motor fuels. Ammonia from coal tar may be purified by selective oxidation of organic impurities and requires a good temperature control.

In addition to the strongly exothermic oxidation reactions referred to above, the apparatus of the present invention may be used with excellent effect for other reactions, some of which are not so strongly exothermic. Thus for example, ammonia can be oxidized to nitrogen oxides, preferably with the omission of uncooled catalyst layers. The catalysts may be uniform or may vary in their strength in the direction of gas flow.

Catalytic reductions with or without the use of pressure are also readily carried out in the converters of this invention. Thus, for example, nitro compounds may be catalytically reduced to the corresponding amines or other intermediate reduction products. Nitrobenzene, nitrotoluol, nitrophenol, nitronaphthalene, and the like are compounds which can be effectively reduced in converters of the present invention. Hydrogenation reactions are also readily carried out in converters of the present invention, for example the hydrogenation of benzol to cyclohexane, phenol to cyclohexanol, naphthalene to tetraline and decaline, crotonaldehyde to normal butyl alcohol, acetaldehyde to ethyl alcohol and the like.

Various synthetic reactions, such as for example the reduction of oxides of carbon to methanol, higher alcohols and ketones or synthetic motor fuel mixtures are well adapted for the converters of the present invention. The processes may be carried out with or without pressure. Other synthetic reactions such as the synthesis of ammonia, hydrocyanic acid and the like, may also be carried out in automatic gas cooled converters according to the present invention.

Other catalytic reactions are of importance, such as the catalytic water gas process catalytic dehydrogenations, dehydrations, condensations and polymerizations. The catalytic splitting off of carbon dioxide from polycarboxylic acids is another reaction for which converters of the present invention are well adapted. Thus, for example, phthalic anhydride may be catalytically split to benzoic acid in converters described above. Composite reactions such as the splitting off of carboxylic groups from phthalic anhydride in a reducing atmosphere to produce benzaldehyde, benzyl alcohol, and the like, the catalytic splitting of the carboxylic group of phthalid to produce benzyl alcohol and other composite reactions may effectively be carried out in converters of the present invention, it being noted that endothermic as well as exothermic reactions are practicable.

Cracking reactions and destructive hydrogenations such as, for example, destructive hydrogenations of crude phenanthrene, are examples of a further type for which the apparatus of the present invention is well adapted. In general almost any vapor phase catalytic reaction can be carried out by means of apparatus employing the principles of the present invention.

The invention will be described in greater detail in connection with the drawings in which—

Fig. 1 is a vertical section through a simple type of converter embodying the principles of the present invention;

Fig. 2 is a cross section through one of the double counter current heat exchangers in Fig. 1, taken along the line 2—2;

Fig. 3 is a detail of a portion of a double current heat exchanger shown in Fig. 1;

Fig. 4 is a vertical section through a converter of the type shown in Fig. 1 but provided with additional heat equalizing means;

Fig. 5 is a detail of a modified form of heat equalizing means;

Figure 6:
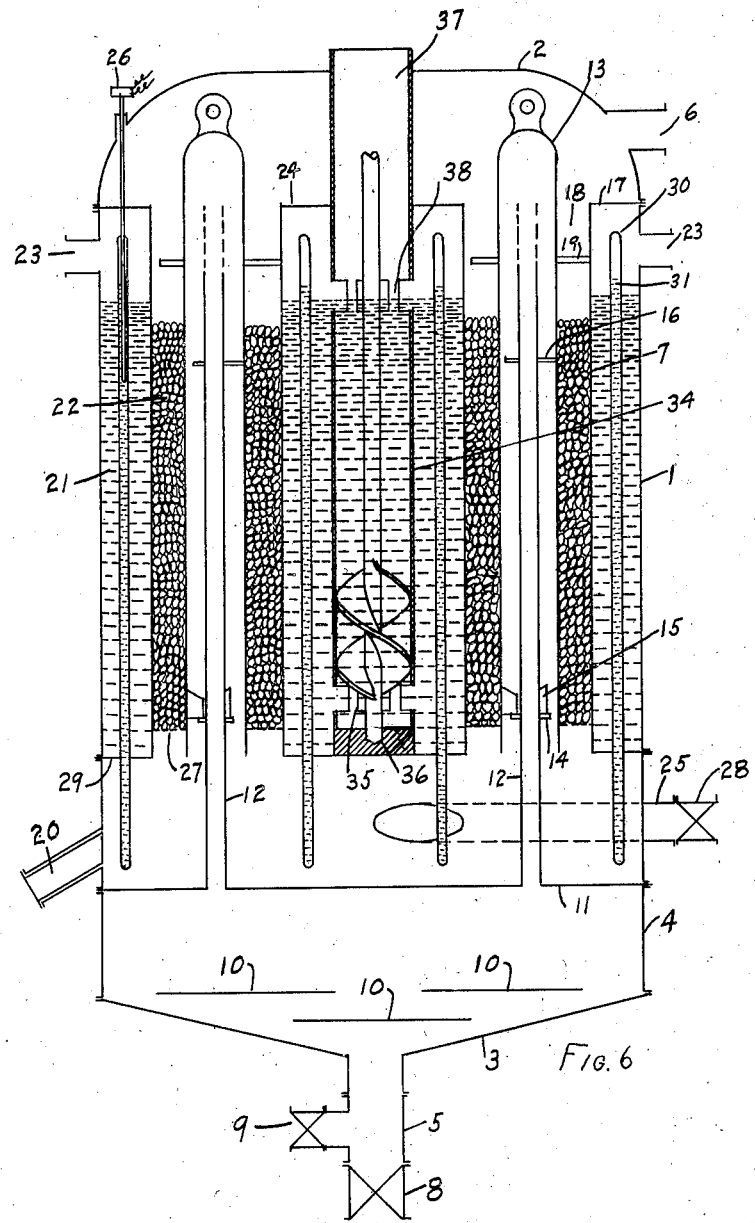
Fig. 6 is a vertical section through a converter of the general type shown in Fig. 4 but provided with bath circulating means.

The converter shown in Fig. 1 consists in a shell 1, top piece 2, and bottom sections 3 and 4. A pipe 5 provided with a valve 8 and with a valved auxiliary pipe 9 serves to lead reaction gases into the bottom piece 3 where they are distributed by the baffles 10. The top piece 2 is also provided with an exit conduit 6. Between the section 4 and the shell section 1 is mounted a perforated partition 11 from which tubes 12 extend upwardly, being provided with perforations at their upper ends, supporting lugs and spacing lugs 16. The tubes 12 extend up into large tubes 7 which with the upper partition 17 and lower partition 29 define a bath chamber which is partly filled with cooling bath 21. The tubes 12 are in the center of the tubes 7 and over them are fitted closed end tubes 13 which are provided with supporting lugs 15 engaging with the lugs 14 of the tubes 12 and spacing lugs 19 which center them in the tubes 7 and also serve as baffles as will be described below. Screens 27 extend between the closed tubes 13 and the walls of the tubes 7 and act as supports for catalyst annuli 22 which fill the portion between the tubes 13 and 7. The spacing lugs 19 are so arranged so as to act as baffles and force gases passing up through the annuli to be deflected to the portion of the top piece opposed to the exhaust conduit 6. The converter is also provided with a suitable thermocouple 26 for measuring the temperature of the bath or for actuating automatic controls or both and the converter shell is also provided with suitable openings 23 for charging the bath and if necessary for permitting vapors to escape. A catalyst removal pipe 21 is also provided. Auxiliary reaction gases may be introduced through the pipe 25, controlled by the valve 28, which enters the converter shell 1 between the partition 11 and the partition 29.

In operation, reaction gas or reaction gases pass in through the pipe 5, are distributed and mixed by the baffles 10, then flow through the tubes 12 in indirect heat exchanging relation with the catalyst annuli since they are separated therefrom by a moving gas, and finally flow out through the perforations at their top, reverse their flow and pass down through the annular space defined between the tubes 12 and 13 and in direct heat exchanging relation with the catalyst annuli until they reach the bottom of the tubes 13 where their flow is again reversed and they pass up through the catalyst annuli and out of the top of the converter through the conduit 6. The cooling effect of the gases is automatic as it increases directly with the amount of gas flowing through and thus serves to maintain constant the temperature of the inner surface of each catalyst annulus. The outer portion of each annulus is cooled by the bath, which may be boiling or non-boiling, or which may be designed to boil at a temperature somewhat above the best reaction temperatures so that in the case of accidental wrong operation resulting in a great increase in temperature the bath can start to boil, thereby acting as a safety valve.

Additional reaction gases can be directly introduced through the pipe 25, passing up through the catalyst without traversing the double counter current heat exchanging elements. This additional gas may be continuously introduced or it may be used as an emergency measure to control excessive temperatures, when so used the valve 28 may advantageously be controlled by the thermocouple 26 through suitable relays. Automatic control may also be effected by permitting the thermocouple 26 to operate the valve 8 or the valve in the pipe 9. Obviously, of course, any other temperature indicating or actuated means may be substituted for the thermocouple 26.

The converter is shown in purely diagrammatic form and without any of the usual accessories or particular arrangements, which do not enter into the present invention. Thus, for example, if the bath is permitted to boil either as a regular cooling or temperature regulating expedient or as an emergency protection or safety valve it would be necessary to connect the openings 23 to suitable reflux condensers and suitable insulation of pipes or provision of additional cooling of the converter shell in contact with the bath by means of fins or other means may be used and should be included in insulations wherever their use is desirable.

The modification shown in Fig. 1 is primarily intended for a type of converter in which the bath does not boil. Where it is desirable to use a boiling liquid to control the temperature or to act as a safety valve it is usually more economical to provide comparatively small containers in contact with the bath liquid as shown in Fig. 4 where containers 30 filled with a liquid 31 are immersed in the bath. These temperature equalizing means may boil or may not boil and for example tend to convey heat from the bath to the zones between the partition 29 and the partition 11 where the incoming reaction gases encounter them with resulting cooling. Of course, the heat equalizing means may also consist of solid metal rods preferably of high heat conductivity.

Where greater heat equalization is desired, it is preferable to use a heat equalizing compartment with a tubular insert as shown in Fig. 5 where the inner tube 32 is preferably provided with perforations 33 at its bottom. This will result in a greater increased speed of circulation with correspondingly increased temperature equalizing effect.

In Fig. 4 the thermocouple 26 is shown as extending into one of the temperature equalizing means. It may, of course, extend into the bath as shown in Fig. 1 or a plurality of temperature indicating or actuated means may be used, some in the bath and some in the heat equalizing means. Automatic control of the reaction gases through suitable thermostatic elements and relays as described in connection with Fig. 1 may, of course, be applied in connection with the structure shown in Fig. 4 where their operation is the same.

Even with a provision of temperature equalizing means, it is sometimes difficult to maintain a uniform temperature throughout the bath as many non-boiling baths are not sufficiently mobile to equalize temperature through conventional current flow and this is particularly the case where the spacing of catalyst tubes or temperature equalizing means is relatively close. Where a greater temperature control is necessary and particularly in connection with reactions which develop a very high exotherm better results may be obtained by mechanically circulating the bath liquid. This is shown in Fig. 6 where a central circulating tube 34 is placed in the center of the bath and is provided with a suitable circulating means such as for example an Archimedean screw 35. The shaft of the screw may have a bearing in the block 35 and extend upward into a compartment 37, which may be in communication with the bath through the pipes 38 and may, of course, be connected to a suitable reflux condenser whenever a boiling bath is to be used. In operation, the screw may cause the bath to be circulated either up through the tube 34 and down around the catalyst containing tubes or vice versa depending on the nature of the reaction carried out and the temperatures in various portions of the catalyst. A vigorous bath circulation, particularly when combined with temperature equalizing elements operating by means of boiling liquids permits an extraordinarily reliable and uniform control of temperature and is a very desirable type of apparatus for highly exothermic and delicate reactions such as the oxidation of many organic compounds to intermediate products. The operation of the converter and gas flow is, of course, identical with that of the converters shown in the foregoing figures.

Figure 7:
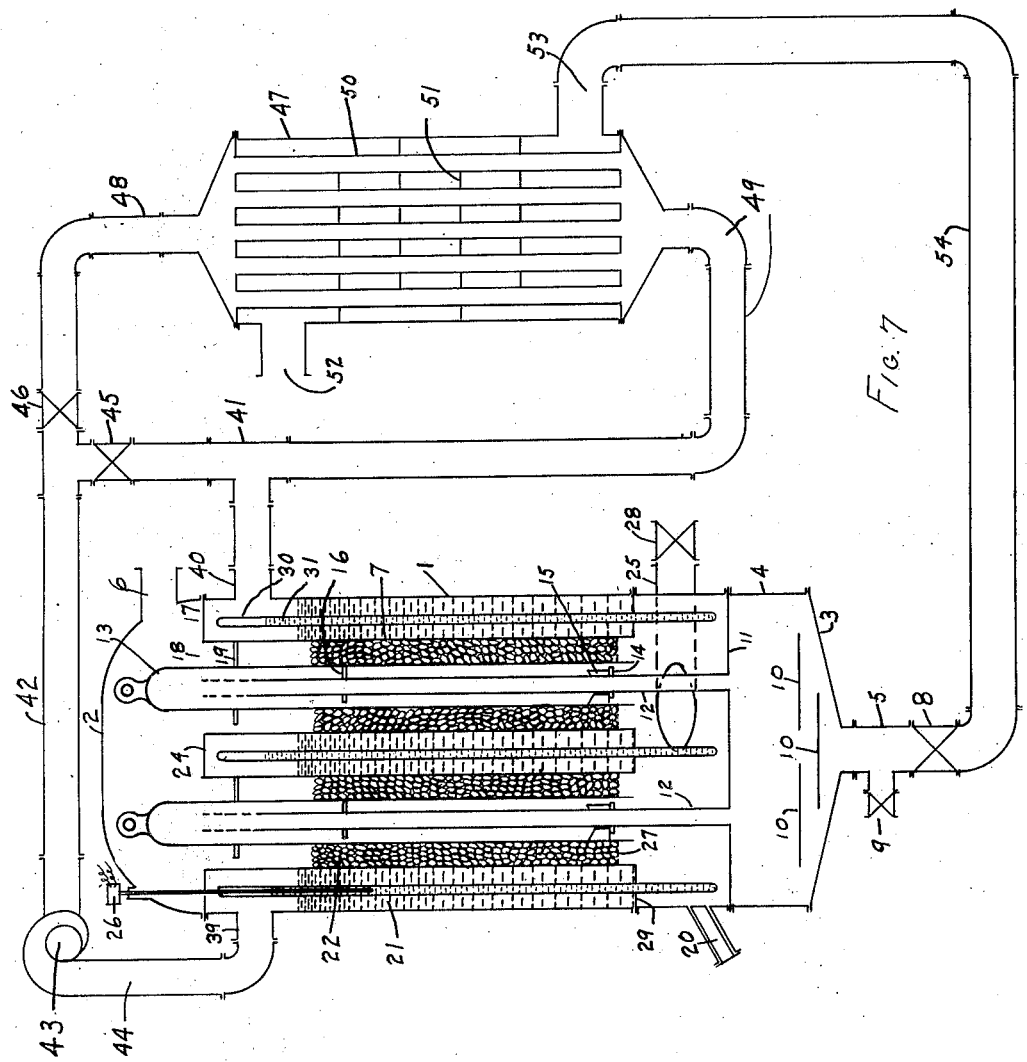
Fig. 7 is a section through a converter system showing a converter of the type illustrated in Fig. 4 combined with means for circulating a cooling gas over the auxiliary heat equalizing means.

When boiling liquid temperature equalizing means are used, particularly in reactions which are highly exothermic, it is desirable to cool the upper portion of the temperature equalizing elements and this may be effected for example by blowing across them a blast of air or suitable gas, preferably one which does not attach the main bath liquid at the reaction temperature. Fig. 7 shows such an arrangement in which a pump 43 forces gas through a pipe 44 into the opening 39 in the converter, thence across the tops of the heat equalizing elements and out through the pipe 40 and into pipe 41 whence it can flow either into the pipe 42 and back through the pump, this flow being controlled by the valve 45, or down through the pipe 49 into the heat exchanger 47, passing through the tubes 50 thereof and out through pipe 48 into the pipe 42, which flow is controlled by the valve 46. The heat exchanger may preferably be used to heat up incoming air or reaction gases which enter through the pipe 52, take a tortuous path over the tubes 50 by reason of the baffles 51 and then pass out through the opening 53 and pipe 54 into the pipe 5.

It will be seen that the cooling gas may either be wholly circulated in a closed circuit by closing the valve 46 and opening the valve 45 and acts as a purely cooling medium, the pipe 42 being preferably left bare or if desired subjected to more intensive cooling, of a suitable adjustment of valves 45 and 46 any proportion of the circulating gas may be passed through the heat exchanger 47 to warm up the reaction gases. It will be clear that for any given reaction the larger the proportion of gas passed through the heat exchanger 47 the hotter will be the incoming reaction gases and correspondingly the greater the heat evolved in the converter. It is therefore possible to control the amount of cooling of the heat equalizing elements, for example, by controlling the speed of the pump 43, and a further control can be effected by varying the amount of gas flowing through the heat exchanger 47. Thus, for example, if temperatures tend to become excessive in the converter valve 46 can be closed and valve 45 opened resulting in the introduction of cooler reaction gases. This control as well as the introduction of reaction gases through the pipe 25 may be effected through suitable automatic controls for example by means of the thermocouple 36 acting through suitable relays. Any combination of manual and automatic control may be used and the best combination in any particular installation will, of course, be chosen by the skilled chemical engineer in the light of the conditions obtaining in the installation.

Figure 8:
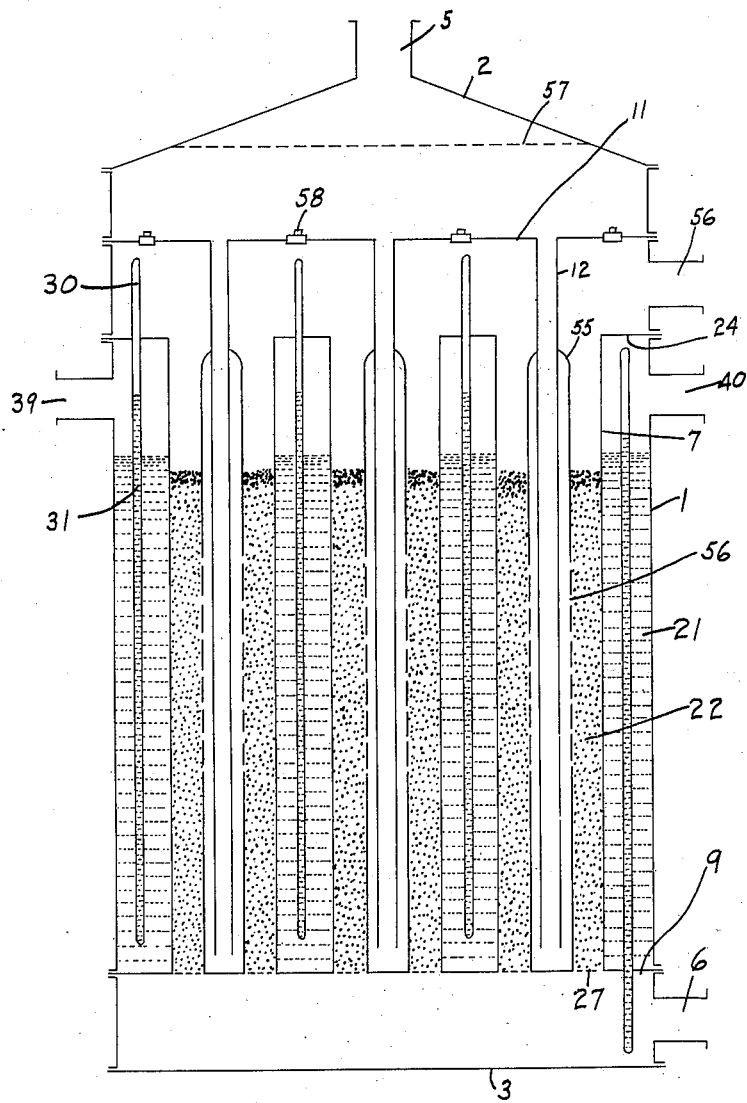
Fig. 8 is a vertical section through a modified type of converter provided with auxiliary heat equalizing means.

Fig. 8 shows a somewhat different design of converter in which the gas is introduced through the top. This converter consists in a shell 1, top piece 2, bottom piece 3, intake pipe 5, exhaust pipe 6, partitions 24 and 29 defining a bath chamber filled with a bath 21, large tubes 7 connecting the partitions and having at their bottom annular screens 27 sustaining catalyst annuli 22. A perforated partition 11 is mounted in the top piece and from it depend tubes 12 passing through the center of the catalyst annuli and surrounded by closed tubes 55 provided with center perforations 56. Suitable heat equalizing elements 30 filled with liquids 31 and an intake pipe 39 and an outlet pipe 40 for cooling gases for the heat equalizing elements are also provided. A second exhaust conduit 56 is also provided in the upper portion of the converter. In operation, gas entering through the pipe 5, passes down through the tubes 12 to the bottom of the tubes 55, thence reverses its flow and passes out from the central perforations into the catalyst annuli and there divides into two streams, part flowing up through the catalyst and out through the pipe 56 and part down through the catalyst and out through the pipe 6. It will be seen, therefore, that the converter is divided into two parts and a greatly increased output can thereby be obtained in reactions which do not require excessive catalyst depths. The converter is also provided with a mixing or baffle screen 57 which, of course, can be replaced with baffle plates. Suitable catalyst filling plugs 58 are also provided. The temperature equalizing elements may extend up into the space traversed by the gases passing out through the pipe 56 or down into the space traversed by the gases passing out through the pipe 6. In Fig. 8 three elements are shown in the former position and one in the latter. Obviously, of course, any suitable combination of these two types can be used.

The construction in Fig. 8 presents an important advantage in that the gases enter the catalyst annuli over a rather large area and this prevents a formation of hot spots, in the case of highly exothermic reactions, where the gases enter the catalyst and where, of course, the most violent reaction takes place since the reacting components are present in the highest concentrations. The construction shown in Fig. 8 is also very compact and permits large outputs in a small space. Obviously, of course, auxiliary cooling of the heat equalizing elements as shown in Fig. 7 may be suitably applied to Fig. 8. With the exception of Fig. 8, all of the double counter flow heat exchanging elements have been shown inverted and this type presents many advantages both from the standpoint of simplicity and cheapness in structure, particularly from the heat equalizing standpoint since fresh reaction gases enter the annuli at the bottom and it is here that the most violent reactions take place. In strongly exothermic reactions the heat evolved is a maximum where the catalyst comes in contact with the bottom of the bath. The greatest heating effect taking place at the bottom of the bath resulting in a rapid circulation thereof and permits the most effective temperature control. It should be understood, however, that the converters may be arranged in the opposite manner, that is to say with the gas entering the top and the double current heat exchanging elements extending from top to bottom and for certain reactions this type of converter is advantageous and is included within the scope of the present invention.

What is claimed as new is:

1. A converter comprising a converter shell, a plurality of relatively large diameter tubes therein, a bath chamber surrounding said tubes, a bath in said chamber, catalyst annuli in said tubes, a double counter current heat exchanging device in the center of each catalyst annulus, means for introducing reaction gases into the converter, and means for causing at least part of the reaction gases so introduced to pass through the double counter current heat exchangers and thence through the catalyst annuli.

2. A converter comprising a converter shell, a plurality of relatively large diameter tubes therein, a bath chamber surrounding said tubes, a bath in said chamber, catalyst annuli in said tubes, a double counter current heat exchanger comprising an open end tube concentrically located in a larger closed end tube in the center of each catalyst annulus, means for introducing reaction gases into the converter, and means for causing at least part of the reaction gases so introduced to pass through the double counter current heat exchangers and thence through the catalyst annuli.

3. A converter according to claim 1 in which heat equalizing means of high heat transfer capacity are located in the cooling bath.

4. A converter according to claim 1 in which means are provided for mechanically circulating the bath.

5. A converter according to claim 1 in which heat equalizing means comprising closed containers filled with liquid are in heat exhanging relation with the bath.

6. A converter according to claim 1 in which heat equalizing means are in heat exchanging relation with the bath liquid and a portion of which are in contact with reaction gases passing through the converter.

7. A converter according to claim 1 in which heat equalizing means are in heat exchanging relation with the liquid bath and extend beyond the bath and means for causing cooling gaseous medium to be circulated over the exposed portions of the heat equalizing means.

8. A converter according to claim 1 in which heat equalizing means are in heat exchanging relation with the liquid bath and extend beyond the bath, means for causing cooling gaseous medium to be circulated over the exposed portions of the heat equalizing means, and means automatically actuated by the bath temperature for varying the cooling effect of said gaseous stream.

9. A converter according to claim 1 in which means are provided for introducing a portion of the reaction gases directly into the catalyst annuli without passing through the double counter current heat exchangers.

10. A converter according to claim 1 in which means are provided for introducing a portion of the reaction gases directly into the catalyst annuli without passing through the double counter current heat exchangers, and means automatically controlled by the bath temperature for varying the proportion of the reaction gases directly introduced.

11. A converter according to claim 1 in which the bath consists in a liquid metal.

12. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a liquid bath in heat exchanging relation with the catalyst.

13. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a non-boiling liquid bath in heat exchanging relation with the catalyst.

14. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a non-boiling liquid metal bath in heat exchanging relation with the catalyst.

15. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a non-boiling liquid metal bath in heat exchanging relation with the catalyst, said bath temperature being regulated by two-phase temperature equalizing means in heat exchanging relation therewith and containing a medium which boils at a temperature at least not greatly above the reaction temperature.

16. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a non-boiling liquid metal bath in heat exchanging relation with the catalyst, said bath temperature being regulated by two-phase temperature equalizing means in heat exchanging relation therewith and containing a medium which boils at or somewhat below the reaction temperature.

17. A method of vapor phase catalysis which comprises passing at least part of the reaction gases through a double counter current heat exchanger in contact with the inner surface of a catalyst annulus, reversing the flow of the gases and passing them longitudinally through the catalyst and removing the heat from the outside of the annulus by means of a non-boiling liquid metal bath in heat exchanging relation with the catalyst, said bath temperature being regulated by two-phase temperature equalizing means in heat exchanging relation therewith and containing a medium which boils at a temperature at least not greatly above the reaction temperature, the non-boiling metal bath being mechanically circulated.

Signed at Pittsburgh, Pa., this 5th day of December, 1927.

ALPHONS O. JAEGER.